(12) United States Patent
Park (10) Patent No.: US 9,727,230 B2
(45) Date of Patent: Aug. 8, 2017

(54) APPARATUS AND METHOD FOR PERFORMING MULTI-TASKING

(71) Applicant: Samsung Electronics Co., Ltd., Gyeonggi-do (KR)

(72) Inventor: Young-Joo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/150,420

(22) Filed: Jan. 8, 2014

(65) Prior Publication Data

US 2014/0208276 A1  Jul. 24, 2014

Related U.S. Application Data

(63) Continuation of application No. 12/931,815, filed on Feb. 11, 2011, now Pat. No. 9,507,508.
(Continued)

(30) Foreign Application Priority Data

Feb. 12, 2010 (KR) .................. 10-2010-0013546
Apr. 19, 2010 (KR) .................. 10-2010-0036108

(51) Int. Cl.
*G06F 3/033* (2013.01)
*G06F 3/0488* (2013.01)
(Continued)

(52) U.S. Cl.
CPC .......... *G06F 3/0488* (2013.01); *G06F 3/0481* (2013.01); *G06F 3/0486* (2013.01); *G06F 3/04883* (2013.01); *G06F 9/4443* (2013.01)

(58) Field of Classification Search
CPC .... G06F 3/0486; G06F 3/04817; G06F 3/048; G06F 3/04886; G06F 3/017; G06F 3/0482; G06F 3/04842; G11B 19/025
See application file for complete search history.

(56) References Cited

U.S. PATENT DOCUMENTS 6,353,451 B1   3/2002   Teibel et al.
7,479,949 B2   1/2009   Jobs et al.
(Continued)

FOREIGN PATENT DOCUMENTS

CN   101116314 A   1/2008
CN   101145098 A   3/2008
(Continued)

OTHER PUBLICATIONS

Using New Function—PCfan and others, vol. 17, 1st Edition, p. 56, Published Jan. 1, 2010.

*Primary Examiner* — Jeffrey A Gaffin
*Assistant Examiner* — Ayesha Huertas Torres
(74) *Attorney, Agent, or Firm* — Cha-Reiter, LLC.

(57) ABSTRACT

Disclosed is an apparatus and method for performing multi-tasking, and more particularly to a multi-tasking performance apparatus and method which easily enable a shift between a plurality of applications being executed and a shift into an initial application. A currently operating application window is simultaneously displayed, with at least one executed application window by overlapping the executed application window on the currently operating application window according to a predetermined format.

9 Claims, 9 Drawing Sheets

Related U.S. Application Data (60) Provisional application No. 61/304,048, filed on Feb. 12, 2010.

(51) Int. Cl.
*G06F 3/0481* (2013.01)
*G06F 3/0486* (2013.01)
*G06F 9/44* (2006.01)

(56) References Cited

U.S. PATENT DOCUMENTS

| | | | |
|---|---|---|---|
| 8,082,523 B2 * | 12/2011 | Forstall | G06F 3/04883 715/778 |
| 8,400,469 B2 | 3/2013 | Kuwabara et al. | |
| 8,683,362 B2 | 3/2014 | Shiplacoff et al. | |
| 2004/0021697 A1 * | 2/2004 | Beaton et al. | 345/810 |
| 2004/0165010 A1 | 8/2004 | Robertson et al. | |
| 2006/0224963 A1 | 10/2006 | Katsuranis et al. | |
| 2006/0248404 A1 | 11/2006 | Lindsay et al. | |
| 2007/0143713 A1 | 6/2007 | Hosoki et al. | |
| 2007/0157099 A1 * | 7/2007 | Haug | 715/769 |
| 2007/0226647 A1 * | 9/2007 | Louch | G06F 9/4443 715/788 |
| 2008/0066006 A1 | 3/2008 | Kim | |
| 2008/0163082 A1 * | 7/2008 | Rytivaara | G06F 1/1626 715/762 |
| 2008/0207188 A1 | 8/2008 | Ahn et al. | |
| 2010/0039566 A1 | 2/2010 | Kim et al. | |
| 2013/0311931 A1 | 11/2013 | Kokubo | |
| 2014/0195962 A1 | 7/2014 | Matthews et al. | |

FOREIGN PATENT DOCUMENTS

| | | |
|---|---|---|
| CN | 101536499 A | 9/2009 |
| CN | 101606121 A | 12/2009 |
| JP | 2000-148348 A | 5/2000 |
| JP | 2003-264614 A | 9/2003 |
| JP | 2005-217522 A | 8/2005 |
| JP | 2006-157386 A | 6/2006 |
| JP | 2006-164290 A | 6/2006 |
| JP | 2006-323850 A | 11/2006 |
| JP | 2007-102389 A | 4/2007 |
| JP | 2007-249596 A | 9/2007 |
| JP | 2007-334747 A | 12/2007 |
| KR | 10-1999-0084778 A | 12/1999 |
| KR | 10-2005-0018145 A | 2/2005 |
| KR | 10-2005-0089362 A | 9/2005 |
| KR | 10-2008-0097789 A | 11/2008 |
| KR | 10-2010-0010072 A | 2/2010 |
| WO | 2009/143076 A2 | 11/2009 |

* cited by examiner

APPARATUS AND METHOD FOR PERFORMING MULTI-TASKING

CROSS REFERENCE TO RELATED APPLICATIONS

The present application is a Continuation of U.S. patent application Ser. No. 12/931,815 filed on Feb. 11, 2011, which claims priority to, and the benefit of the earlier filing date, under 35 U.S.C. §119(a), to that Korean Patent Application filed in the Korean Intellectual Property Office on Feb. 12, 2010 and assigned Serial No. 10-2010-0013546 and Korean Patent Application filed in the Korean Intellectual Property Office on Apr. 19, 2010 and assigned Serial No. 10-2010-0036108 and under 35 U.S.C. §119(e) to that U.S. Provisional application filed on Feb. 12, 2010 in the U.S. Patent and Trademark Office and assigned Ser. No. 61/304,048, the entire disclosures of all of which are hereby incorporated by references.

BACKGROUND

1. Field of the Invention

The present invention relates to an apparatus and method for performing multi-tasking, and more particularly to a multi-tasking apparatus and method which easily enable a shift between a plurality of applications being executed and into an initial application.

2. Description of the Related Art

In general, the software platforms in mobile terminals still use a single tasking application. However, it is difficult for a mobile terminal having such a single tasking environment to remain in existence in a smart phone market.

Today mobile terminals capable of performing multi-tasking are being dominant in the smart phone market as a growing trend is from a single tasking platform to a multi-tasking platform. Therefore, a large number of users can perform multi-tasking with their own mobile terminals, without difficulty.

In order to maximize the user convenience in multi-tasking environments, an appropriate interface providing a notification to the user and easily performing a shift between executed applications is required.

However, in the mobile terminal, there is yet no effective interface which can achieve a dynamic shift of an application, such as the shift of a foreground window, and can maintain the current state so that the user can easily return to an initial application.

Figure 1A:
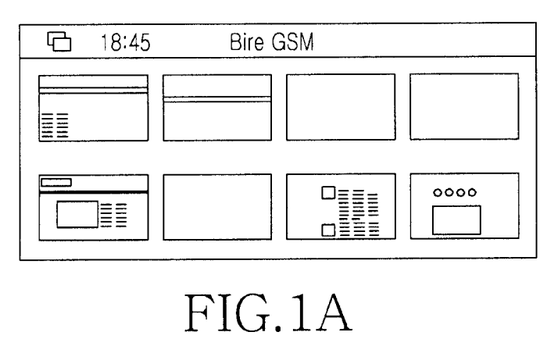
FIGS. 1A and 1B view showing examples where multi-tasking is performed in a conventional mobile terminal.
Figure 1B:
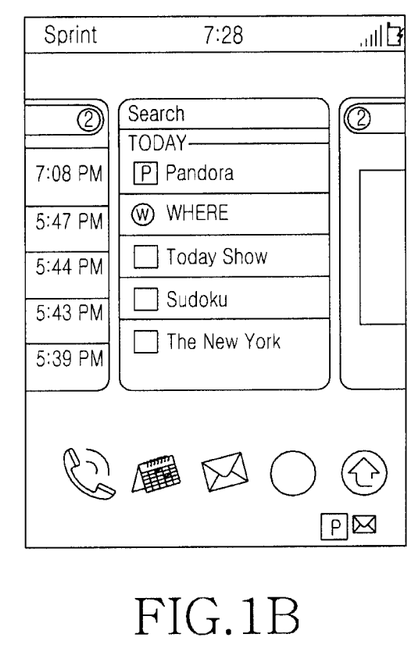

FIGS. 1A and 1B are views showing examples where multi-tasking is performed in a conventional mobile terminal. Referring to FIGS. 1A and 1B, an application shift interface in the mobile terminal typically focuses on opening and displaying currently executed windows side by side. Further, since it is necessary for the user to remove the currently executed window in order to see all windows being executed by the user, the user must terminate an initial application.

Moreover, in order to make a shift into an initial application while executing a plurality of applications, the user must inevitably find out the location of the initial application from among the plurality of applications.

SUMMARY

Accordingly, the present invention has been made to solve the above-mentioned problems and drawbacks occurring in the prior art and provides additional advantages, by providing g an apparatus and method for performing multi-tasking which easily enable a shift between a plurality of applications being executed.

Also, the present invention provides an apparatus and method for performing multi-tasking which easily enable a shift or return to an initial application, e.g. an original application currently being operated by the user during the course of executing a plurality of applications.

Further, the present invention provides an apparatus and method for performing multi-tasking which enable the user to see a plurality of executed applications, which may include an application currently being operated and an application in a standby state for operating, at the same time.

In addition, the present invention provides an apparatus and method for performing multi tasking to easily terminate a plurality of executed applications through a simple gesture.

In accordance with an aspect of the present invention, an apparatus for performing multi-tasking includes: a display unit including a first region in which an initial application is executed in a multi-tasking's initial mode and a plurality of applications displayed in the second region are executed in a multi-tasking's execution mode, and a second region in which the plurality of applications are displayed; a task manager for moving a corresponding application of a plurality of applications displayed in the second region to the first region and executing the corresponding application in the multi-tasking's execution mode, and performing a transition to the multi-tasking's initial mode when a background is selected, and a controller for controlling multi-tasking to be performed through the task manager in the multi-tasking's initial/execution mode.

In accordance with another aspect of the present invention, a method for performing multi-tasking in a mobile terminal includes: executing an initial application in a first region of a display unit and displaying a plurality of applications in a second region of the display unit in a multi-tasking's initial mode; executing a corresponding application in the first region when the corresponding application of a plurality of applications displayed in the second region moves to the first region in a multi-tasking's execution mode; and performing a transition to the multi-tasking's initial mode when a background is selected.

In accordance with still another aspect of the present invention, a method for performing multi-tasking includes: displaying a currently operating application window; and simultaneously displaying at least one executed application window and the currently operating application window by overlapping the at least one executed application window on the currently operating application window.

In accordance with still another aspect of the present invention, an apparatus for performing multi-tasking includes: a controller for calling a task manager when there is at least one executed application window; and the task manager for simultaneously displaying the at least one executed application window and a currently operating application window by overlapping the at least one executed application window on the currently operating application window.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Hereinafter, exemplary embodiments of the present invention will be described with reference to the accompanying drawings. In the following description, the same elements will be designated by the same reference numerals although they are shown in different drawings.

Figure 2:
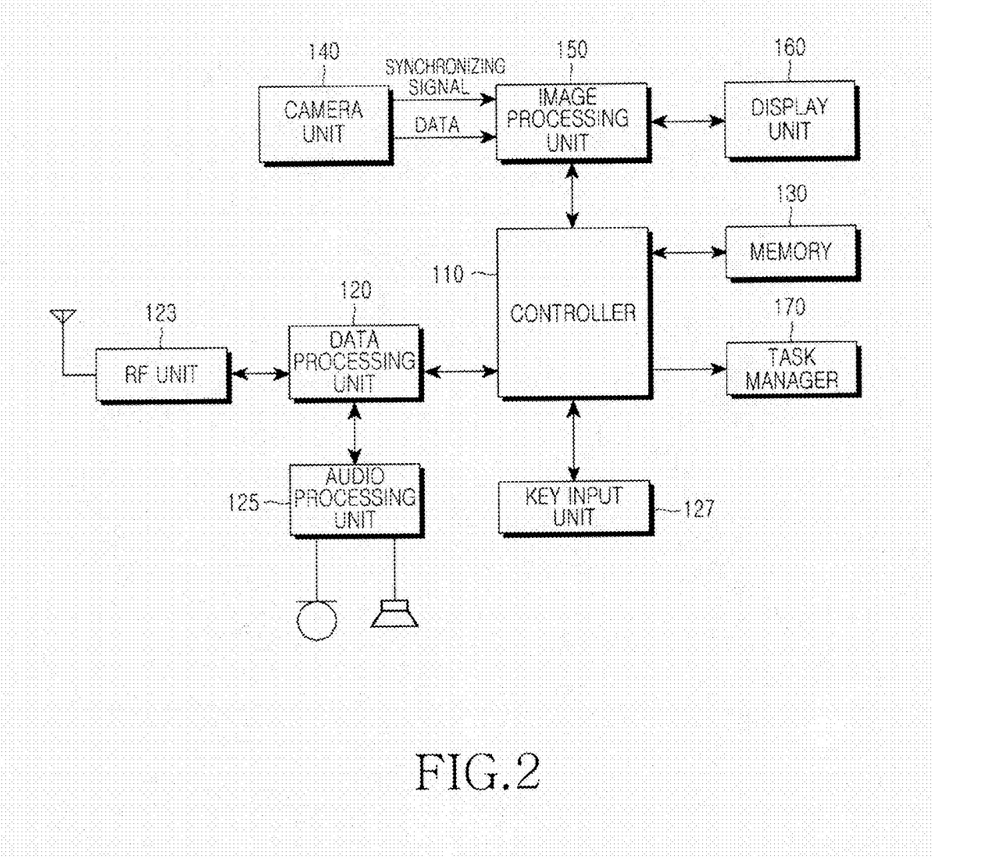
FIG. 2 is a block diagram illustrating the configuration of a mobile terminal according to an embodiment of the present invention.

FIG. 2 is a block diagram illustrating the configuration of a mobile terminal according to an embodiment of the present invention.

Referring to FIG. 2, a radio frequency (RF) unit 123 performs a wireless communication function of the mobile terminal. The RF unit 123 includes an RF transmitter for up-converting a frequency of a signal to be transmitted and amplifying the up-converted signal, and an RF receiver for low-noise amplifying a received signal and down-converting a frequency of the low-noise amplified signal.

A data processing unit 120 includes a transmitter for encoding and modulating the signal to be transmitted, a receiver for demodulating and decoding the received signal, etc. That is, the data processing unit 120 may include a modem and codec. Here, the codec includes a data codec for processing a packet data and so on, and an audio codec for processing audio signals, such as voice.

An audio processing unit 125 reproduces a received audio signal output from the audio codec of the data processing unit 120, and transmits a transmission audio signal, which has been generated from a microphone, to the audio codec of the data processing unit 120.

A key input unit 127 includes keys for inputting numeric and text information, and function keys for setting various functions.

A memory 130 may be configured by a program memory and a data memory. The program memory may store programs for controlling the general operation of the mobile terminal, and programs for controlling multi-tasking performance according to an embodiment of the present invention. Also, the data memory temporarily stores data generated while the programs are being executed.

A controller 110 functions to control the overall operation of the mobile terminal. The controller 110 controls an application task manager 170 to perform multi-tasking according to an embodiment of the present invention. In alternate embodiment, the controller 110 may include the application task manager 170.

A camera unit 140 captures the image of an object and includes a camera sensor for converting an optical signal obtained through photographing to an electric signal, and a signal processor for converting an analog image signal obtained by the camera sensor to digital data. Here, it is assumed that the camera sensor is a charge-coupled Device or complementary metal-oxide-semiconductor (CMOS) sensor, and the signal processor can be implemented with a digital signal processor (DSP). Note that the camera sensor and the image processor may be integrally or separately constructed.

An image processing unit 150 performs image signal processing (ISP) for displaying an image signal output from the camera unit 140 in a display unit 160, wherein the ISP includes gamma correction, interpolation, spatial change, image effect, image scale, AWB, AE, AF, etc. Accordingly, the image processing unit 150 processes an image signal, which is output from the camera unit 140, in units of frames, and outputs the frame image data to meet the characteristic and size of the display unit 160. Also, the image processing unit 150 may include a video codec, which serves to compress the frame image data displayed on the display unit 160 in a preset mode, and to restore the compressed frame image data into original frame image data. Here, the video codec may include a JPEG codec, an MPEG4 codec, a Wavelet codec, etc. It is assumed that the image processing unit 150 has an on-screen display (OSD) function and can output OSD data according to the size of a display screen under the control of the controller 110.

The task manager 170 performs a multi-tasking operation under the control of the controller 110 according to an embodiment of the present invention.

Also, according to an embodiment of the present invention, during the initial mode of the multi-tasking, the task manager 170 displays and executes an initial application on a first region of the display unit 160 and displays and executes a plurality of applications on a second region of the display unit 160.

The initial application displayed on the first region and the plurality of applications displayed on the second region are applications being executed, and the initial application may be a first or last selected application among a plurality of applications selected by the user.

Further, during a multi-tasking's execution mode, when a predetermined application among the plurality of applications in the second region moves into the first region through a drag/drop up operation or flick up operation, the task manager 170 shifts the initial application into a background so as to display the initial application as the background while shifting the predetermined application into a foreground for display. The flick operation means an operation of flicking up or down, and is an operation, such as a fast scroll.

In this case, the predetermined application is moved to and displayed in the first region in the same size as that displayed in the second region. Then, when an unpinching or pinching operation is performed by the user, the task manager 170 displays the predetermined application in an enlarged or reduced size. The unpinching operation means an operation of opening two fingers, which have been placed close to each other, to be away from each other, and corresponds to a zoom-in operation of extending or enlarging something. The pinching operation means an operation of moving two fingers, which have been placed away from each other, to be closer together, and corresponds to a zoom-out operation of reducing or making something smaller.

Further, during the multi-tasking's execution mode, when a plurality of applications are displayed in the first region, and a background, into which the initial application has been shifted, is selected, the task manager 170 directly performs a transition to the multi-tasking's initial mode, in which only the initial application is displayed in the first region, and a plurality of applications is displayed in the second region.

Also, during the multi-tasking's initial/execution mode, the task manager 170 can enlarge/reduce a plurality of applications displayed in the second region through a zoom operation.

When a predetermined part for a zoom-in/zoom-out operation in the second region is dragged, the task manager 170 may perform either a zoom-in operation of enlarging a plurality of applications in the second region so as to enable the user to specifically see a corresponding application, or a zoom-out operation of reducing the plurality of applications in the second region so as to enable all of the plurality of applications to be displayed, according to the direction of the drag.

Further, during the multi-tasking's initial/execution mode, when a flick down or drag down operation is performed on a predetermined application among a plurality of applications displayed in the second region, the task manager 170 terminates the predetermined application.

According to another embodiment of the present invention, the task manager 170 sets a currently operating application window as a background, and overlaps and displays at least one executed application window on a predetermined region of the screen.

Further, according to another embodiment of the present invention, the task manager 170 displays an application window selected from a predetermined region of a screen as a foreground of the screen in response to a first gesture, e.g. a flick up or drag/drop up operation.

Further, according to another embodiment of the present invention, in the course of displaying at least one executed application window in a predetermined region of the screen, when a background is touched, the task manager 170 may display a currently operating application window as a foreground of the screen, thereby returning to the original operating application window.

Further, according to another embodiment of the present invention, the task manager 170 may move an application window, which has been selected from a predetermined region of the screen, back to the predetermined region of the screen, and display the application window in the predetermined region of the screen in response to a second gesture, e.g. a drag down operation, thereby canceling the selection of the application window.

Further, according to another embodiment of the present invention, the task manager 170 may terminate an application selected from a predetermined region of the screen in response to a third gesture, e.g. a flick down or drag/drop down operation.

Further, according to another embodiment of the present invention, the task manager 170 may enlarge/reduce at least one executed application window, which is being overlapped and displayed on a predetermined region of the screen, through a zoom-in/zoom-out operation.

The display unit 160 displays a video signal output from the image processing unit 150 through a screen, and displays user data output from the controller 110. Here, the display unit 160 may be configured with a liquid crystal display (LCD) unit. In this case, the display unit 160 may include an LCD controller, a memory to store image data, and an LCD display element. When the LCD unit is embodied in a touch screen type, the display unit 160 may be operated as an input unit.

In addition, according to an embodiment of the present invention, the display unit 160 includes a first region and a second region in a multi-tasking mode. Here, the first region acts to display an initial application in a multi-tasking's initial mode and acts to display a corresponding application of a plurality of applications, which are displayed in the second region, in a multi-tasking's execution mode. The second region displays a plurality of applications being executed.

Also, according to another embodiment of the present invention, the display unit 160 displays a currently operating application window as a background, and overlaps and displays at least one executed application window on a predetermined region of a screen.

The multi-tasking operation of the aforementioned mobile terminal will be described with reference to FIGS. 3 to 9.

Figure 3:
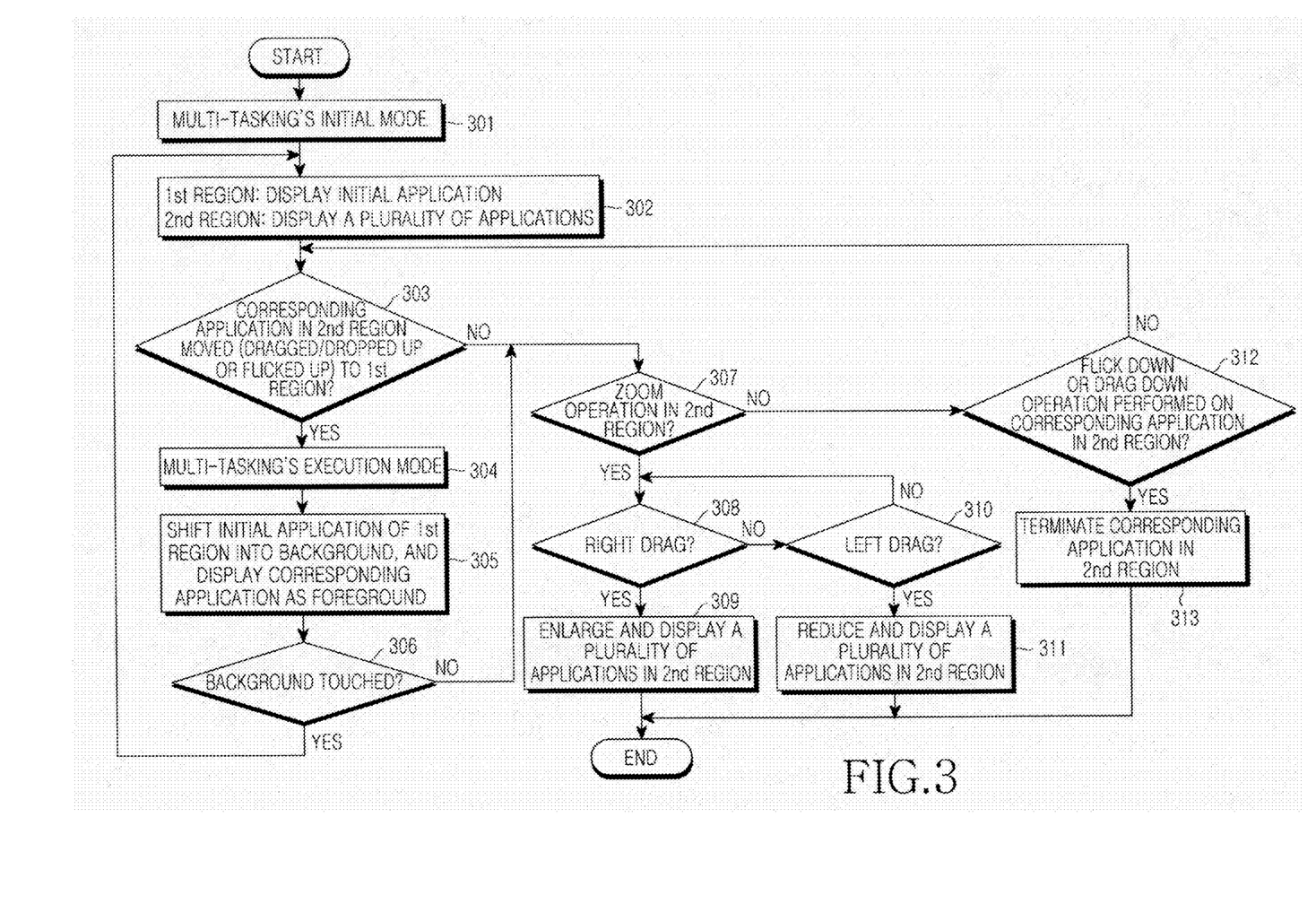
FIG. 3 is a flowchart illustrating a procedure of performing multi-tasking in a mobile terminal according to an embodiment of the present invention.

FIG. 3 is a flowchart illustrating the process of performing a multi-tasking operation in a mobile terminal according to an embodiment of the present invention.

Referring to FIGS. 2 and 3, when a mobile terminal user selects a plurality of applications, the task manager 170 performs step 301. Here, the task manager 170 transitions the mobile terminal into a multi-tasking's initial mode under the control of the controller 110.

Thereafter, the task manager 170 performs step 302, where the task manager 170 displays a first or last selected application among a plurality of applications selected by the user as an initial application in a first region of the display unit 160. Also, in step 302, the task manager 170 displays the other applications, except for the initial application, among the plurality of applications selected by the user as thumbnails in the order selected by the user in a second region of the display unit 160.

Hence, the initial application displayed in the first region and the applications displayed in the second region are applications which are being executed.

When a predetermined application among the applications displayed in the second region moves into the first region through a drag/drop up operation or flick operation, the task manager 170 senses the operation in step 303, and proceeds to step 340, where the task manager 170 shifts the mobile terminal into a multi-tasking's execution mode.

In the multi-tasking's execution mode, the task manager 170 performs step 305, where the task manager 170 shifts the initial application, which has been executed in the first region, into a background while shifting the predetermined application moved from the second region into a foreground for execution.

In step 305, the predetermined application moves from the second region to the first region and displayed in a thumbnail size. Then, when an unpinching or pinching operation on the image of the predetermined application is performed by the user, the task manager 170 senses the operation and displays the predetermined application in an enlarged or reduced size in the first region.

In the multi-tasking's execution mode, whenever an application among a plurality of applications displayed in the second region moves into the first region, the task manager 170 may rearrange the positions of the other applications displayed in the second region.

Also, when a drag/drop down or flick down operation is performed on a predetermined application, which has moved from the second region and displayed in the first region, the task manager 170 may also move and display the predetermined application to an original position of the second region.

In the multi-tasking's execution mode, in the course of executing a plurality of applications moved from the second region in the first region, when the background into which the initial application has been shifted is touched, the task manager 170 senses the touch in step 306, and performs a transition to the multi-tasking's initial mode, in which the initial application is displayed in the first region and a plurality of applications is displayed in the second region.

Therefore, while a plurality of applications is being executed in the first region, the user can perform a transition to the multi-tasking's initial mode just by one touch operation on the background at any time.

In the multi-tasking's initial mode or multi-tasking's execution mode, when a drag operation is performed on a predetermined part for performing a zoom operation in the second region, the task manager 170 senses the drag operation in step 307 and determines the direction of the drag operation.

When the drag direction for the zoom operation is to the right-hand side, the task manager 170 senses the drag operation in step 308, and proceeds to step 309, where the task manager 170 enlarges and displays a plurality of applications displayed in the second region. In step 309, the task manager 170 can specifically display the respective applications by gradually enlarging the plurality of applications displayed in the second region according to the distance of the drag having moved to the right-hand side.

In step 309, when it is not possible to display all of the plurality of enlarged applications in the second region, one or more enlarged applications not able to fit in the second region may be displayed in the second region through a drag operation on a displayed search drag bar.

In contrast, when the drag direction for the zoom operation is to the left-hand side, the task manager 170 senses the drag direction in step 310 and proceeds to step 311, where the task manager 170 reduces and displays a plurality of applications displayed in the second region. In step 311, the task manager 170 gradually reduces a plurality of applications displayed in the second region according to the distance of the drag having moved to the left-hand side, thereby making it possible to display all of the plurality of applications displayed in the second region.

In the multi-tasking's initial mode or multi-tasking's execution mode, when a drag down or flick down operation is performed on a predetermined application among a plurality of applications displayed in the second region, the task manager 170 senses the operation in step 312 and proceeds to step 313, where the task manager 170 terminates the predetermined application.

FIGS. 11A-D illustrates a zoom operation for at least one executed application window in FIG. 3. Along the arrow on the top end in FIGS. 11A-D, a window of a plurality of applications displayed in the second region is gradually enlarged in size according to the change in distance (or length) of the drag-left action, whereas along the arrow on the bottom end in the FIGS. 11A-D, a window of a plurality of applications displayed in the second region is gradually reduced according to the change in distance (or length) of the drag-right action.

Figure 4:
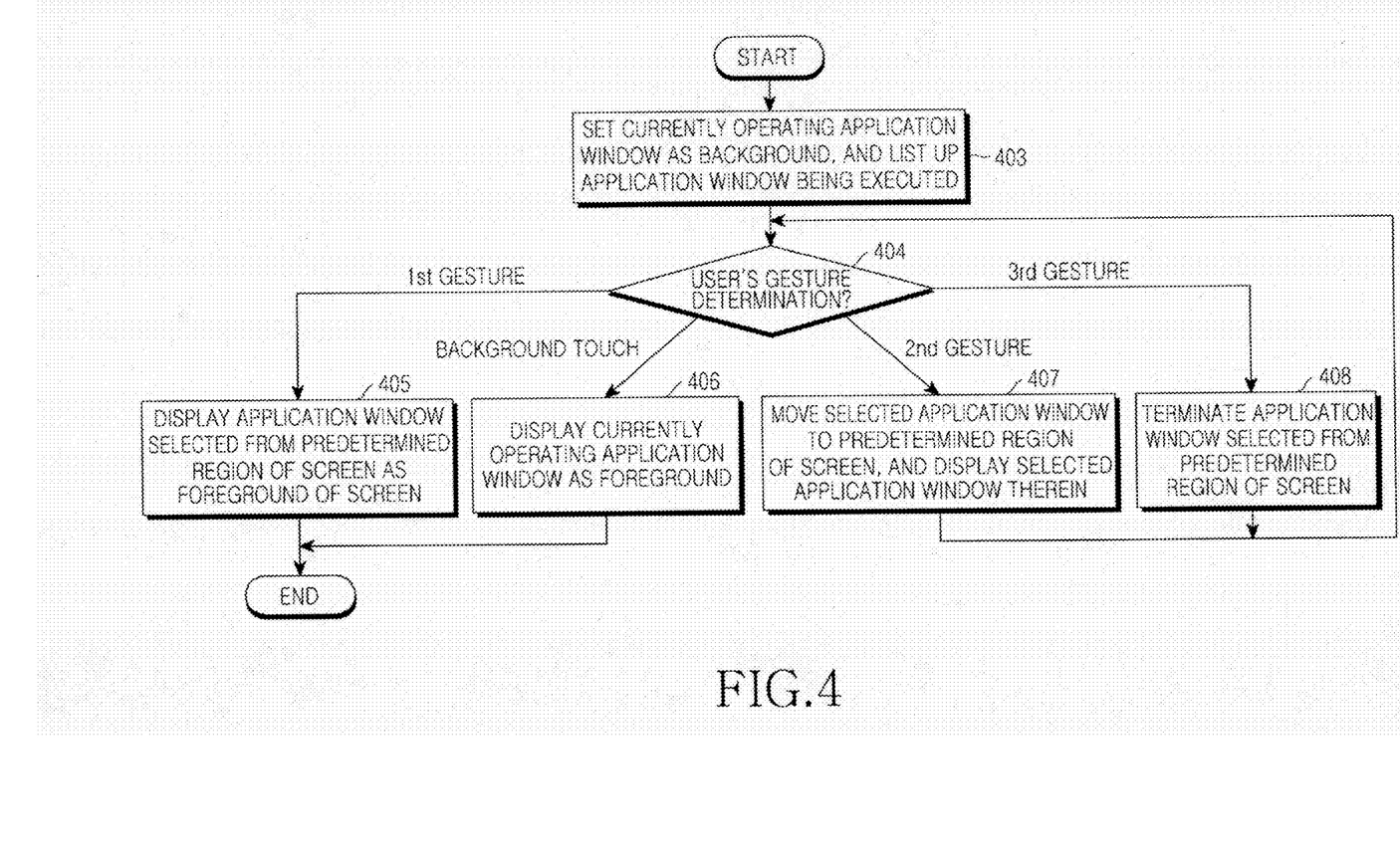
FIG. 4 is a flowchart illustrating a procedure of performing multi-tasking in a mobile terminal according to another embodiment of the present invention.
Figure 5:
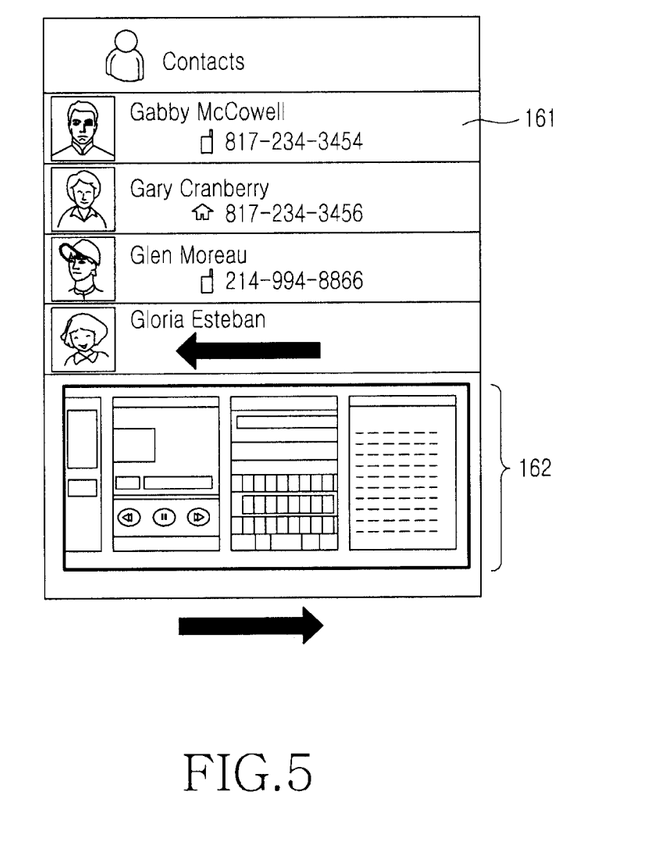
FIG. 5 is a view explaining an operation of overlapping and displaying at least one executed application window in FIG. 4.
Figure 6A:
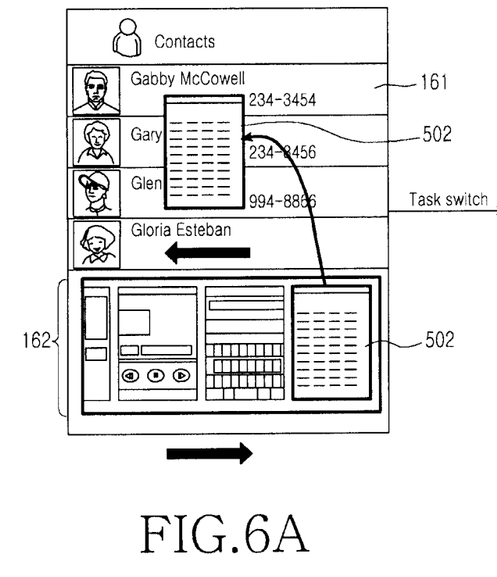
FIG. 6A and FIG. 6B are views explaining an operation of displaying at least one executed application window as a foreground window of a screen in FIG. 4.
Figure 6B:
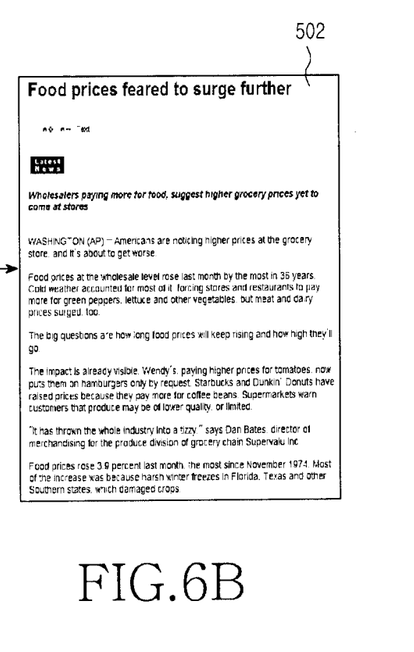
Figure 7:
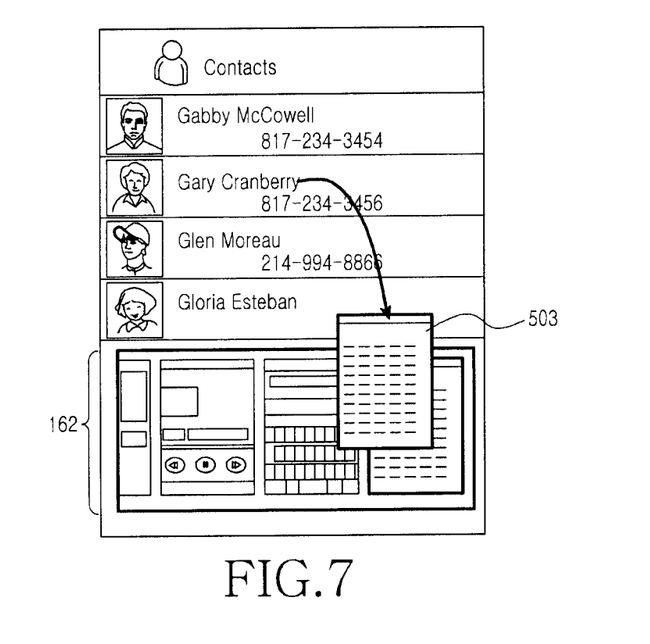
FIG. 7 is a view explaining an operation of canceling the selection of at least one executed application window in FIG. 4.
Figure 8:
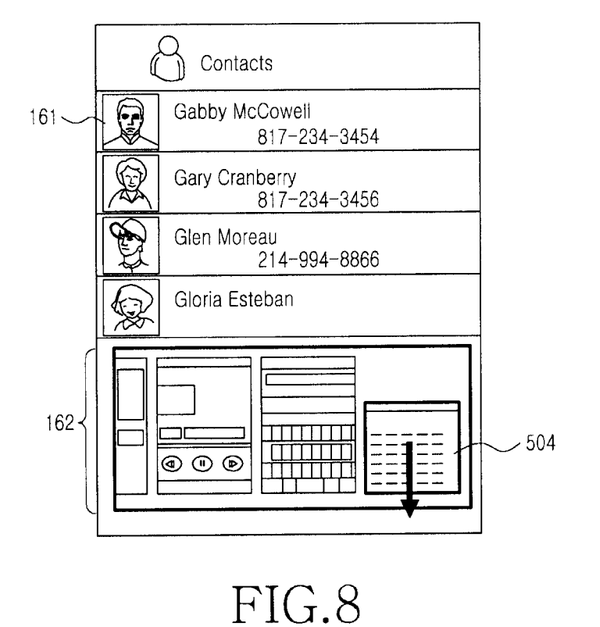
FIG. 8 is a view explaining an operation of terminating at least one executed application window in FIG. 4.
Figure 9:
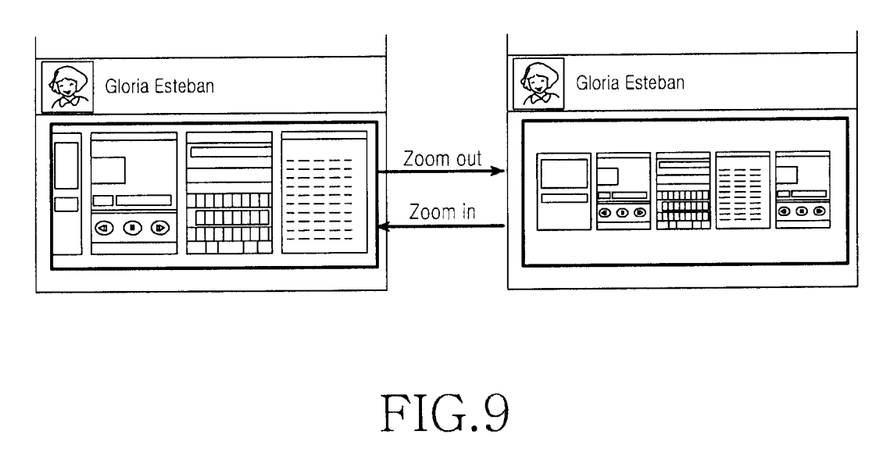
FIG. 9, FIG. 10A, FIG. 10B, FIG. 10C and FIG. 10D are views explaining a zoom operation for at least one executed application window in FIG. 4.

FIG. 4 is a flowchart illustrating a process of performing multi-tasking in a mobile terminal according to another embodiment of the present invention. FIG. 5 is a view explaining an operation of overlapping and displaying at least one executed application window in FIG. 4. FIG. 6 is a view explaining an operation of displaying at least one executed application window as a foreground window of a screen in FIG. 4. FIG. 7 is a view explaining an operation of canceling the selection of at least one executed application window in FIG. 4, FIG. 8 is a view explaining an operation of terminating at least one executed application window in FIG. 4, and FIGS. 9 and 10 are views explaining a zoom operation for at least one executed application window in FIG. 4.

Referring to FIG. 4, while an operating application window being currently operated is being displayed in the display unit 160 of the mobile terminal, the controller 110 performs step 403. Here, the controller 110 determines if there is an application being executed in the mobile terminal. In step 403, when there is at least one executed application, the controller 110 senses it and informs the task manager 170.

The called task manager 170 sets a currently operating application window as a background, and performs a list-up process (see FIG. 5) of overlapping and displaying at least one executed application window on a predetermined region of the screen of the display unit 160 to display the executed application window and the currently operating application window at the same time.

FIG. 5 illustrates step 403 and shows an operation where a currently operating application window 161 is set as a background in the screen of the display unit 160, and at least one executed application window 162 is overlapped and displayed on a predetermined region of the screen, e.g. the lower portion of the screen, so that both the executed application window and the currently operating application window are displayed at the same time.

In step 403, the task manager 170 determines a gesture of the user. When a first gesture is performed by the user in step 403, the task manager 170 senses it in step 404, the task manager 170 proceeds to step 405, (see FIG. 6) where the task manager 170 displays selected executed application as a foreground of the screen.

FIG. 6 explains step 405. In particular, FIG. 6A illustrates an operation where a first gesture, e.g. a flick up or drag/drop up, is performed on one 502 of the executed application window 162, which is being displayed on the lower portion of the screen. FIG. 6B illustrates an operation of displaying the selected application window 502, which has been flicked up or dragged/dropped up, as a foreground.

In operation, when a background is touched by the user in step 403, the task manager 170 senses it in step 404, the task manager 170 proceeds to step 406, where the task manager 170 shifts the currently operating application window, which has been set as the background, into a foreground of the screen, thereby returning to the original operating application window.

Meanwhile, when a second gesture is performed by the user in step 403 (see FIG. 7), the task manager 170 senses it in step 404, and proceeds to step 407, where the task manager 170 again moves an application window, which has been selected from the predetermined region of the screen, into the predetermined region of the screen, thereby canceling the selection of the application. In step 407 (see FIG. 7), an application, which has been selected from a predetermined region of the screen in order to shift the selected application into a foreground of the screen, is again moved to and displayed in the predetermined region of the screen, so that the selection of the application is canceled.

FIG. 7 explains step 407 and illustrates an operation where an application 503, which has been selected from a predetermined region of the screen, i.e. the lower portion of the screen, in order to display the application 503 as a foreground of the screen is moved to and displayed in the lower portion of the screen through a second gesture, e.g. a drag down, thereby canceling the selection of the application 503.

Further, when a third gesture is performed by the user in step 403, the task manager 170 senses the gesture in step 404 and proceeds to step 408, where the task manager 170 terminates the application window selected from a predetermined region of the screen.

FIG. 8 explains step 408 and illustrates an operation where an application 504 selected from the lower portion of the screen, which is a predetermined region of the screen, is terminated by the third gesture, e.g. a flick down or drag/drop down.

Meanwhile, the task manager 170 can enlarge/reduce and display the at least one executed application window, which is being overlapped and displayed on a predetermined region of the screen, through a zoom-in/zoom-out operation. The zoom-in/zoom-out operation may be achieved through a selection or drag of a predetermined region for the zoom-in/zoom-out operation.

FIG. 9 illustrates the zoom-in/zoom-out operation on one executed application, which is being overlapped and displayed on a lower portion of the screen. Also, FIG. 10 shows a detailed example of a zoom-in/zoom-out operation on at least one executed application, which is being displayed on a lower portion of the screen. In particular, FIG. 10 illustrates a zoom-in/zoom-out operation which is performed as a predetermined value displayed in a predetermined region is selected.

Figure 10A:
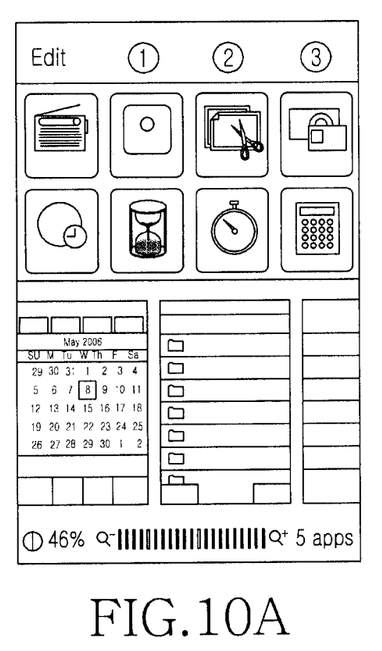
Figure 10B:
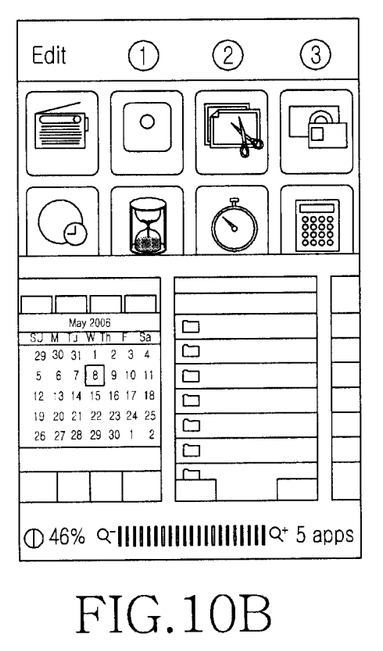
Figure 10C:
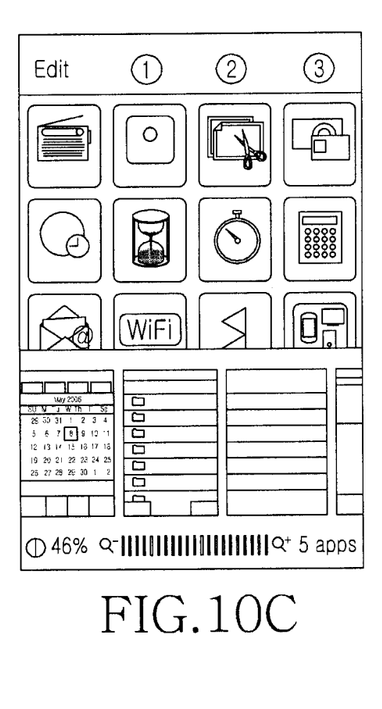
Figure 10D:
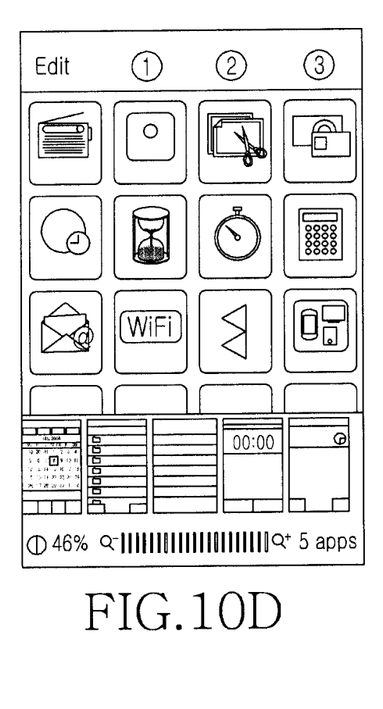
Figure 11A:
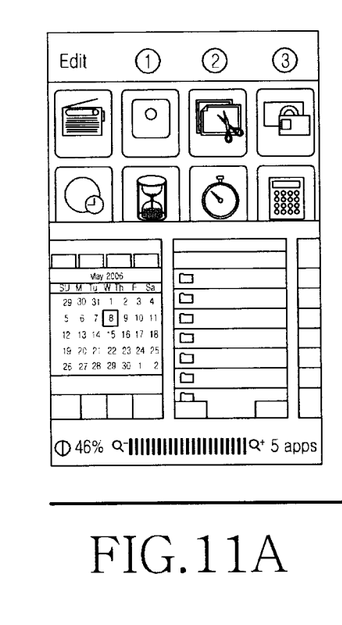
FIG. 11A, FIG. 11B, FIG. 11C and FIG. 11D are views explaining a zoom operation for at least one executed application window in FIG. 3.
Figure 11B:
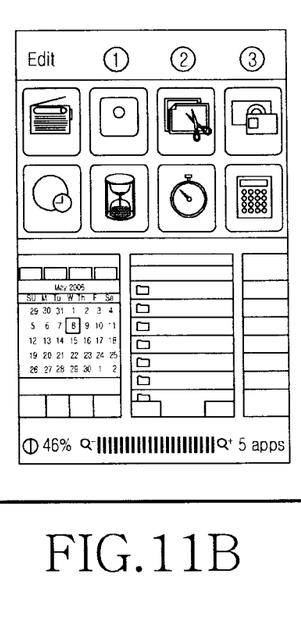
Figure 11C:
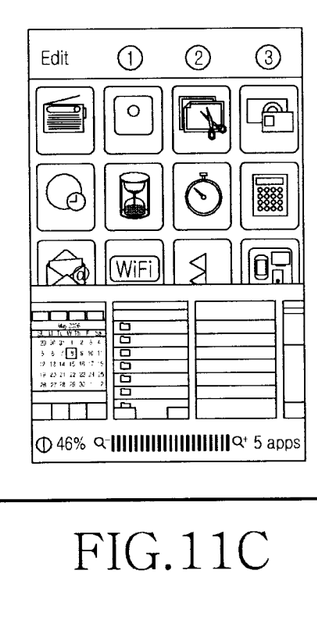
Figure 11D:
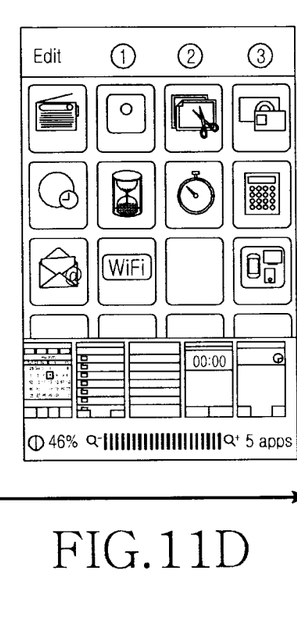

FIG. 10A illustrates at least one executed application which is being displayed according to a default value, and FIG. 10B illustrates at least one executed application which is being displayed as a maximum value is selected. In addition, FIG. 10C illustrates at least one executed application being displayed as an intermediate value is selected, and FIG. 10D illustrates at least one executed application which is being displayed as a minimum value is selected.

As is apparent from the foregoing, the present invention has an advantage in performing multi-tasking and enabling it easier shift between applications being executed and a shift into an initial application. In addition, the inventions allows to see a plurality of executed applications at the same time, while providing means to easily terminate a desired application through a simple gesture.

The above-described methods according to the present invention can be realized in hardware or via the execution of software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A mobile terminal, comprising:
a touch screen; and
a controller for controlling the touch screen to:
display an execution screen of a first application in a first region of the touch screen and display, at the same time, a plurality of objects corresponding respectively to a plurality of other applications being executed on the mobile terminal in a second region of the touch screen, the first application currently being operated by a user of the mobile terminal, the plurality of other applications being different from the first application,
the controller configured to be responsive to a first gesture input on the touch screen to enable the user to select an object corresponding to a second application from the plurality of other applications to cause a direct transition to an execution screen of the second application which is exclusively displayed in an area substantially comprising both the first and second regions of the touch screen so as to perform task switching,
wherein the second region is displayed on a lower portion of the touch screen,
wherein prior to the first gesture input, the second region is devoid of any object associated with the first application, and
wherein the controller is configured to be responsive to a second gesture input on the second region of the touch screen to enable the user to select an object corresponding to an application from the plurality of other applications for termination and removal from the touch screen.

2. The mobile terminal as claimed in claim 1, wherein the controller is configured to display, in response to a third gesture input with respect to the second region, an object corresponding to an application executed on the mobile terminal that is not initially displayed in the second region.

3. The mobile terminal as claimed in claim 1, wherein the controller is further configured to display the plurality of objects corresponding respectively to the plurality of other applications in an order selected by the user of the mobile terminal.

4. The mobile terminal as claimed in claim 1, wherein the controller is further responsive to the first gesture input to cause images of the plurality of objects in the second region to be replaced by a portion of the execution screen of the second application.

5. The mobile terminal of claim 1, wherein when the execution screen of the second application is displayed, the touch screen is devoid of any selectable objects for any other applications.

6. A mobile terminal, comprising:
a touch screen; and
a controller for controlling the touch screen to:
display an execution screen of a first application in a first region of the touch screen and display, at the same time, a plurality of objects corresponding respectively to a plurality of other applications being executed on the mobile terminal in a second region of the touch screen, the first application currently being operated by a user of the mobile terminal, the plurality of other applications being different from the first application, the controller configured to be responsive to a first gesture input on the touch screen to enable the user to select an object corresponding to a second application from the plurality of other applications to cause a direct transition to an execution screen of the second application which is exclusively displayed in an area substantially comprising both the first and second regions of the touch screen so as to perform task switching, wherein, the second region is displayed on a lower portion of the touch screen, prior to the first gesture input, the second is devoid of any object associated with the first application, the controller is configured to be responsive to a second gesture input on the second region of the touch screen to enable the user to select an object corresponding to an application from the plurality of other applications for termination and removal from the touch screen, and the controller is configured to control the touch screen to display, substantially, only the execution screen of the second application in response to the first gesture input on the touch screen.

7. The mobile terminal of claim 6, wherein when the execution screen of the second application is displayed, the touch screen is devoid of any selectable objects for any other applications.

8. A mobile terminal, comprising:
a touch screen; and
a controller for controlling the touch screen to:
display an execution screen of a first application in a first region of the touch screen and display, at the same time, a plurality of objects corresponding respectively to a plurality of other applications being executed on the mobile terminal in a second region of the touch screen, the first application currently being operated by a user of the mobile terminal, the plurality of other applications being different from the first application, the controller configured to be responsive to a first gesture input on the touch screen to enable the user to select an object corresponding to a second application from the plurality of other applications to cause a direct transition to an execution screen of the second application which is exclusively displayed in an area substantially comprising both the first and second regions of the touch screen so as to perform task switching, wherein, the second region occupies substantially an entire width of the touch screen on a lower portion thereof, the controller is configured to be responsive to a second gesture input on the second region of the touch screen to enable the user to select an object corresponding to an application from the plurality of other applications for termination and removal from the touch screen, and prior to the first gesture input, the second region is devoid of any object associated with the first application.

9. The mobile terminal of claim 8, wherein when the execution screen of the second application is displayed, the touch screen is devoid of any selectable objects for any other applications.

* * * * *